(12) United States Patent
Kasugai et al.

(10) Patent No.: US 9,543,624 B2
(45) Date of Patent: Jan. 10, 2017

(54) ELECTRICAL STORAGE MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Masakuni Kasugai, Yokkaichi (JP); Hiroki Shimoda, Yokkaichi (JP); Kazuyuki Nakagaki, Yokkaichi (JP); Masato Tsutsuki, Yokkaichi (JP); Makoto Higashikozono, Yokkaichi (JP); Hisashi Sawada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 39 days.

(21) Appl. No.: 14/433,755

(22) PCT Filed: Sep. 2, 2013

(86) PCT No.: PCT/JP2013/073488
§ 371 (c)(1),
(2) Date: Apr. 6, 2015

(87) PCT Pub. No.: WO2014/065007
PCT Pub. Date: May 1, 2014

(65) Prior Publication Data
US 2015/0236387 A1 Aug. 20, 2015

(30) Foreign Application Priority Data
Oct. 24, 2012 (JP) ................. 2012-234535

(51) Int. Cl.
*H01M 10/50* (2006.01)
*H01M 10/6551* (2014.01)
(Continued)

(52) U.S. Cl.
CPC ...... *H01M 10/6551* (2015.04); *H01M 10/6557* (2015.04); *H01M 10/0472* (2013.01); *H01M 10/0486* (2013.01)

(58) Field of Classification Search
CPC ............... H01M 10/6551; H01M 10/0472; H01M 10/0486
See application file for complete search history.

(56) References Cited

U.S. PATENT DOCUMENTS

| | | |
|---|---|---|
| 2006/0088761 A1 | 4/2006 | Ota et al. |
| 2011/0059347 A1 | 3/2011 | Lee et al. |
| 2013/0120910 A1* | 5/2013 | Watanabe ............ H01G 9/155 361/517 |

FOREIGN PATENT DOCUMENTS

| | | |
|---|---|---|
| EP | 2 262 040 A1 | 12/2010 |
| JP | 2006-210312 A | 8/2006 |

(Continued)

OTHER PUBLICATIONS

Jul. 6, 2015 Search Report issued in European Application No. 13848753.3.

(Continued)

*Primary Examiner* — Patrick Ryan
*Assistant Examiner* — Ben Lewis
(74) *Attorney, Agent, or Firm* — Oliff PLC

(57) ABSTRACT

An electricity storage module includes a stack, holder members, and heat-transfer plate members. The stack is formed by stacking power storage elements having lead terminals protruding outward from end portions. The holder members are made of insulating resin and are attached to the end portions of the power storage elements, the holder members holding the power storage elements. The heat-transfer plate member are disposed between power storage elements adjacent in a stacking direction, the heat-transfer plate members made of heat conductive material. An engaging portion is (Continued)

provided on one of the holder members and the heat-transfer plate members, and an engaged portion arranged to be engaged by the engaging portion is provided on the other of the holder members and the heat-transfer plate members. The holder members and the heat-transfer plate members are integrated by mutual engagement of the engaging portions and the engaged portions.

13 Claims, 18 Drawing Sheets

(51) Int. Cl.
      *H01M 10/6557*     (2014.01)
      *H01M 10/04*       (2006.01)

(56)          References Cited

FOREIGN PATENT DOCUMENTS

| | | | | |
|---|---|---|---|---|
| JP | 2009-301877 A | 12/2009 | | |
| JP | 2012-033709 | * 2/2012 | ............. | H01G 9/155 |
| JP | 2012-523086 A | 9/2012 | | |
| WO | 2012/015068 A1 | 2/2012 | | |

OTHER PUBLICATIONS

Nov. 5, 2013 International Search Report issued in International Application No. PCT/JP2013/073488.

\* cited by examiner

ELECTRICAL STORAGE MODULE

BACKGROUND

This application is a national stage application of PCT/JP2013/073488, international filing date Sep. 2, 2013, and claims priority to JP 2012-234535, filed in Japan on Oct. 24, 2012, the entire disclosures of which are hereby incorporated by reference in their entirety.

The present invention relates to an electricity storage module.

Known examples of power storage elements that contain power storage devices include secondary batteries, such as lithium ion batteries and nickel hydrogen batteries. A plurality of secondary batteries, such as lithium ion batteries, are connected together to form a battery module. One such battery module is known, for example, from JP 2006-210312A.

SUMMARY

JP 2006-210312A discloses a battery module composed of a plurality of stacked electric cells with positive and negative lead terminals protruding from their ends. In this battery module, adjacent electric cells are connected in series by connecting differently polarized (oppositely polarized) lead terminals.

In the battery module described in JP 2006-210312A, to prevent shorting between the lead terminals, insulating plates are disposed on both sides of the lead terminals to sandwich the lead terminals therebetween. For that reason, in this battery module, the electric cells adjacent in the stacking direction are speed apart by the thickness of the insulating plates. However, in battery modules, such as this one, formed by stacking a plurality of power storage elements, the temperatures of the power storage elements may be elevated due to repeated charge and discharge. High temperatures may potentially affect the performance of the power storage elements.

Preferred embodiments were completed in the light of the above-described circumstances, and their object is to provide an electricity storage module with improved heat dissipation.

One possible approach to improve heat dissipation is, for example, to provide a configuration in which heat conductive plate members, such as metal plates, are disposed between power storage elements adjacent in the stacking direction. However, if power storage elements are simply interleaved with metal plates, shorting may possibly caused, for example, by contact between the metal plates and the lead terminals of the power storage elements.

In the light of the above, to prevent shorting and improve heat dissipation, we considered a configuration in which members made of an insulating material (insulating members) are used where the lead terminals are disposed and members made of a heat conductive material (heat conductive members) are used where the power storage elements themselves are disposed. However, if the insulating members and the heat conductive members are separately (unconnectedly) provided, the members may be displaced by vibration, etc., thus causing shorting due to contact, for example, between the heat conductive members and the lead terminals. Accordingly, it is preferable to integrate the insulating members and the heat conductive members so as to prevent displacement therebetween.

In view of the above, a configuration to efficiently integrate the insulating members and the heat conductive members was identified by earnest investigation. Preferred embodiments were made based on the novel findings.

In particular, preferred embodiments are directed to an electricity storage module comprising a stack formed by stacking a plurality of power storage elements having positive and negative lead terminals that protrude outward from end portions thereof; holder members made of an insulating resin and attached at least to those of the end portions of the power storage elements, from which the lead terminals protrude, the holder members holding the power storage elements; and heat-transfer plate members disposed between power storage elements that are adjacent in a stacking direction, the heat-transfer plate members being made of a heat conductive material for conducting heat generated by the power storage elements to the outside; wherein an engaging portion is provided on one of the holder members and the heat-transfer plate members, and an engaged portion for being engaged by the engaging portion is provided on the other of the holder members and the heat-transfer plate members; and wherein the holder members and the heat-transfer plate members are integrated by mutual engagement of the engaging portions and the engaged portions.

In the preferred embodiments, the heat-transfer plate members and the holder members can be integrated by mutual engagement of the engaging portions provided on either of them and the engaged portions provided on the other. Accordingly, the heat-transfer plate members and the holder members are integrated by mutual engagement of the engaging portions provided on either of them and the engaged portions provided on the other. As a result, according to the preferred embodiments, a battery module with improved heat dissipation can be provided that also prevents shorting due to contact with the lead terminals, etc.

The preferred embodiments may have the features described below. The holder members may be formed with slide portions on which the heat-transfer plate members are slidably mounted. This configuration further improves the working efficiency of integrating the heat-transfer plate members and the holder members.

A plurality of engaging portions and a plurality of engaged portions may be provided at opposing positions. As this configuration permits the heat-transfer plate members to be attached to the holder members at a plurality of opposing positions, it reliably prevents displacement of the members.

A case that accommodates the stack, the holder members, and the heat-transfer plate members may be provided, and the heat-transfer plate members may be provided with heat conductive walls that are in contact with inner wall surfaces of the case to conduct the heat generated by the power storage elements to the outside. This configuration is provided with excellent heat dissipation as it permits the heat generated by the power storage elements to be conducted to the case via heat conductive walls and released to the outside of the case.

Among the plurality of power storage elements, the power storage element disposed at one end in the stacking direction may be positioned in contact with an inner wall surface of the case. This configuration is provided with further improved heat dissipation as it permits the heat generated by the power storage element at that end in the stacking direction to be conducted to a heat conductive wall of the case and released to the outside of the case.

An electricity storage module with improved heat dissipation can be provided according to the preferred embodiments.

DETAILED DESCRIPTION OF EMBODIMENTS

Embodiment 1

Embodiment 1 as applied to a battery module 10 will be described hereafter with reference to FIGS. 1-18. In the ensuing description, the left side as seen in FIG. 4 is referred as the front, and the right side as seen in FIG. 4 is referred as the rear, whereas the upper side as seen in FIG. 4 is referred as upward and the lower side as seen in FIG. 4 is referred as downward.

The battery module 10 of this embodiment is used, for example, as the battery module 10 of an integrated starter generator (ISG).

Battery Module 10

Figure 1:
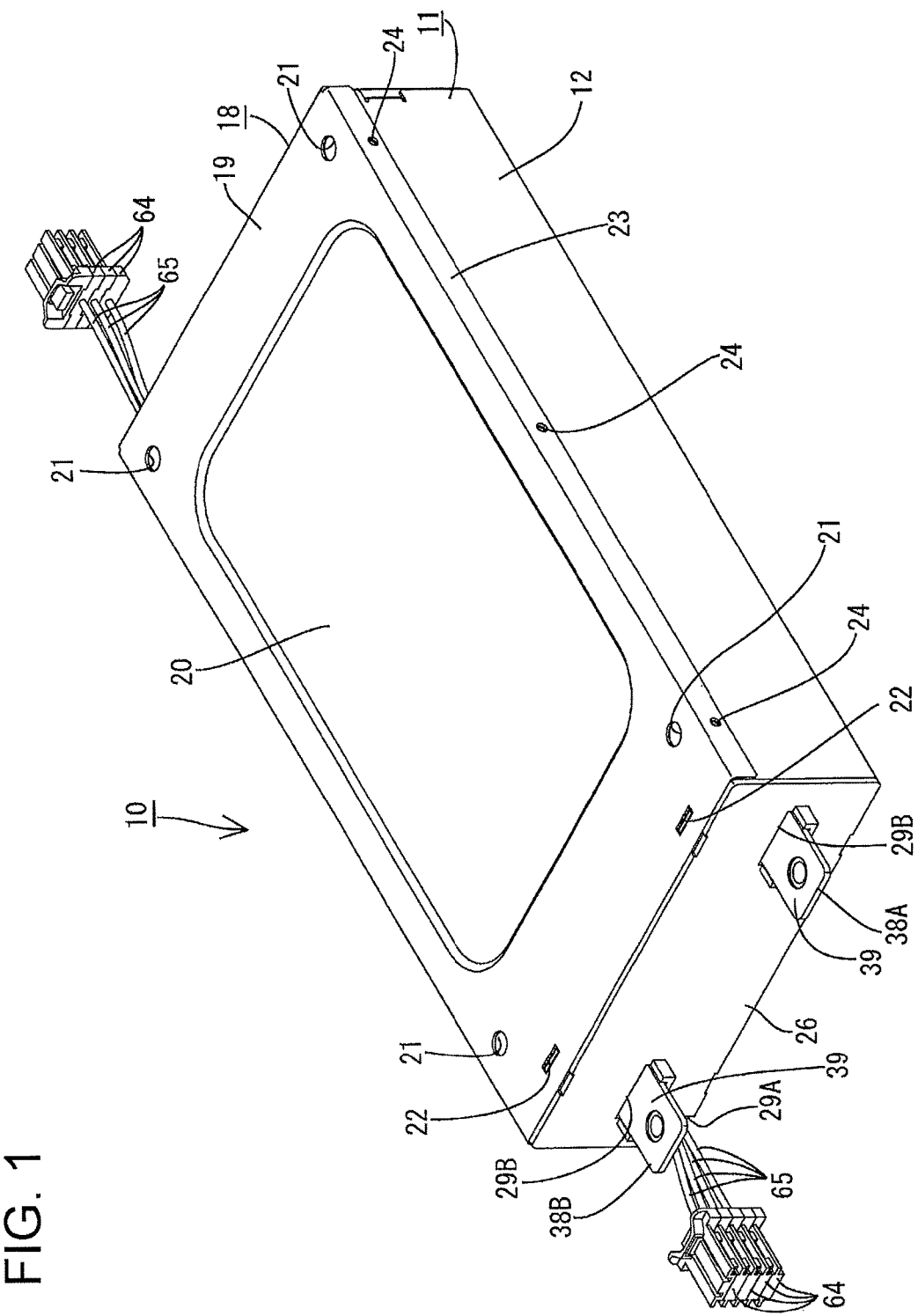
FIG. 1 is a perspective view of an electricity storage module of Embodiment 1.

As shown in FIG. 1, the battery module 10 generally has approximately the shape of a rectangular parallelepiped. A plurality of wires 65 connected to the lead terminals 34 of the respective electric cells 32 (an example of power storage elements) are drawn out of the front and rear sides (the left and right sides as seen in FIG. 1) of the battery module 10 to the outside. The plurality of wires 65 are each connected at one end to a lead terminal 34 of the respective electric cell 32 via a plate-shaped voltage detection terminal 66 and at the other end to a voltage detection output connector 64 (referred to as a "connector 64" hereinafter).

The plurality of connectors 64 connected to the wires 65 drawn out or the front side and the plurality of connectors 64 connected to the wires 65 drawn out of the rear side are each integrated by being stacked together.

As shown in FIG. 4, the battery module 10 includes a stack 30 formed by stacking a plurality of electric cells 32 (six electric cells 32 in this embodiment), holder members 40 connected to both ends of each electric cell 32, heat-transfer plates 60 (an example of heat-conductive plate members) disposed between the electric cells 32 adjacent in the stacking direction (the vertical direction), and a metal case 11 that accommodates these.

Case 11

The case 11 includes a main case body 12 that accommodates the stack 30 and a lid portion 18 fitted on the top side of the main case body 12. The main case body 12 is open at the top side and the front side. Formed at the top end of the rear side of the main case body 12 is a wire draw-out hole (not shown) for drawing the plurality of wires 65 out of the case 11. An insulation lid portion 26 is attached to the opening at the front of the main case body 12.

As shown in FIG. 1, the lid portion 18 includes an approximately rectangular plate portion 19 and fixing portions 23 extending approximately vertically downward with respect to the plate portion 19 and fixed at the top end of the main case body 12. Formed at the center of the plate portion 19 is a protruding surface 20 that protrudes inward (downward). The protruding surface 20 of the lid portion 18 is capable of coning into contact with the uppermost (top-tier) electric cell 32. With the protruding surface 20 of the lid portion 18 in contact with the electric cell 32, the heat generated by the electric cell 32 is transferred to the lid portion 18 and released to the outside.

Formed through the plate portion 19 outside of the protruding surface 20 are fixing holes 21 in which the first fixing members (not shown) are disposed to fix together the lid portion 18, the stack 30, and the main case body 12. The diameter of the fixing holes 21 is smaller than the outer diameter of the first fixing a members.

Additionally, rectangular holes 22 are formed through the front end of the plate portion 19. These holes 22 serve as lid locking holes 22 that lock the insulation lid portion 26 mounted at the front.

Formed on the fixing portions 23 are a plurality (three) of approximately circular insertion holes 24 into which the second fixing members (not shown) can be inserted to fix the lid portion 18 to the main case body 12. The fixing portions 23 are fitted over a pair of sides (the fore side and the hind side in FIG. 1) and the rear side on the outside of the main case body 12.

Busbar draw-out ports 29B for drawing out busbars 38 are formed in the insulation lid portion 26 mounted to the opening at the front of the main case body 12.

As shown in FIG. 1, an approximately rectangular cutout 29A is formed at the lower edge of the insulation lid portion 26 to draw out the plurality of wires 65. In addition to covering the opening of the main case body 12, the insulation lid portion 26 serves to insulatively protect the lead terminals 34 arranged at the front end of the stack 30.

Stack 30

Figure 2:
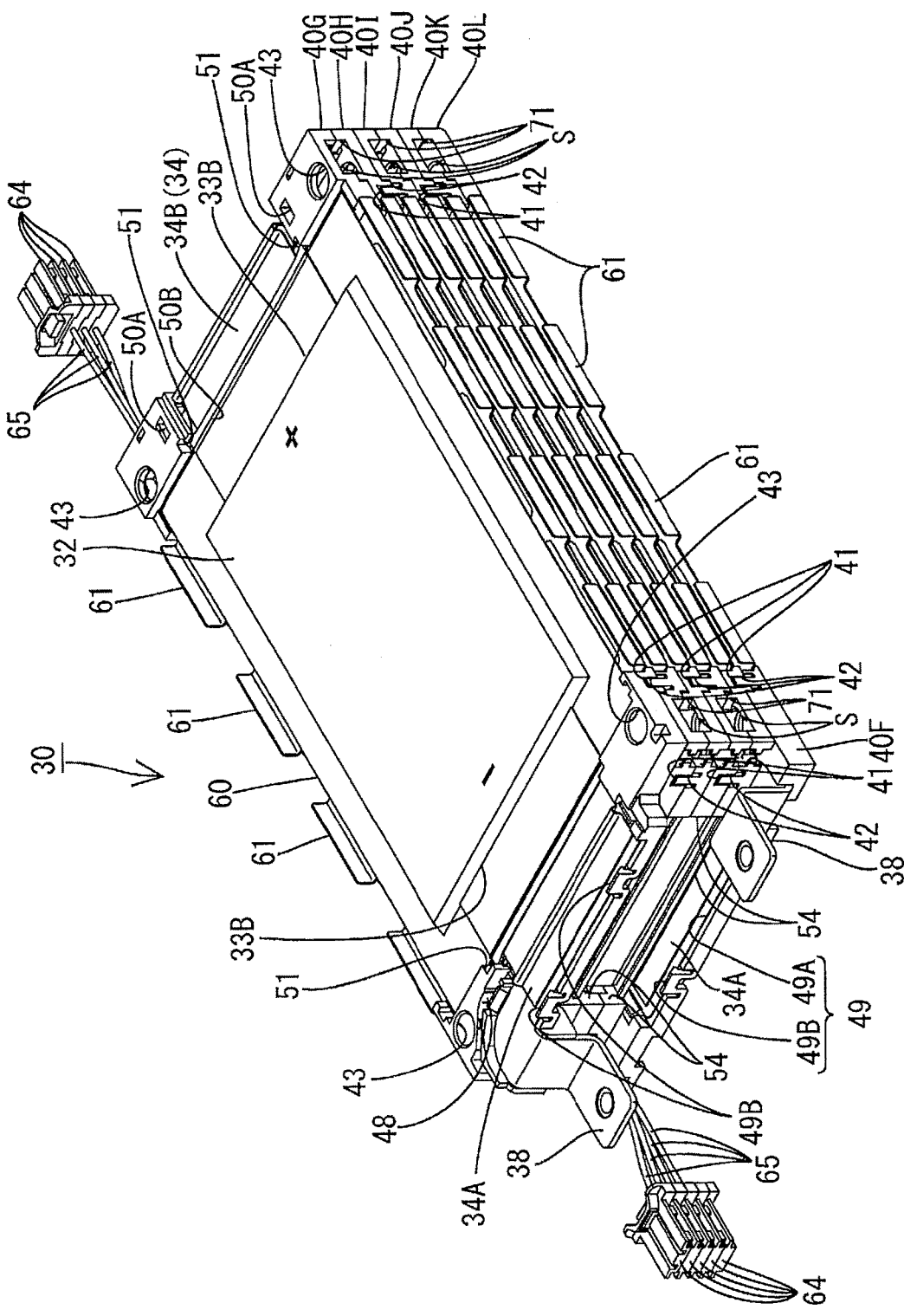
FIG. 2 is a perspective view of a stack.
Figure 3:
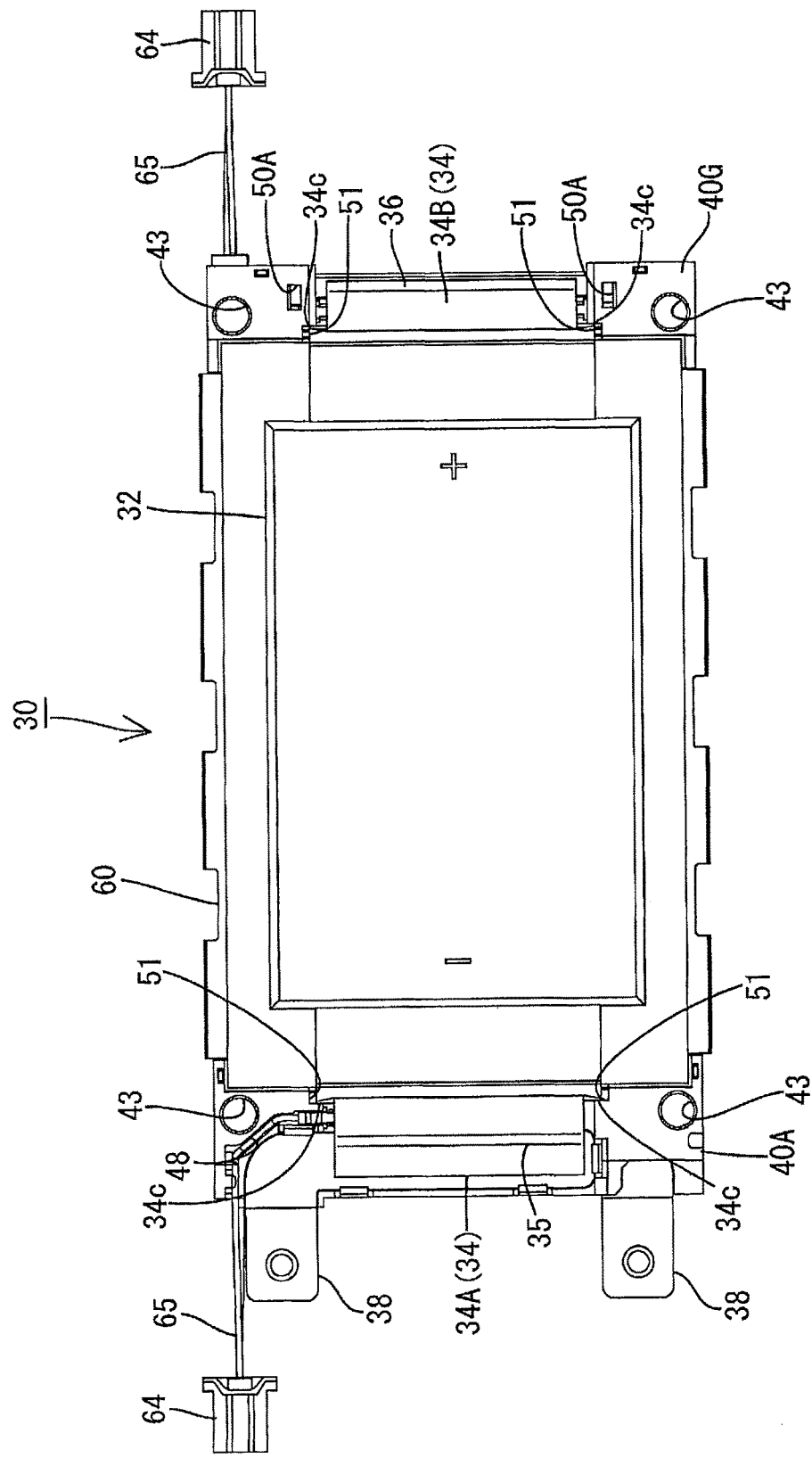
FIG. 3 is a plan view of the stack.
Figure 4:
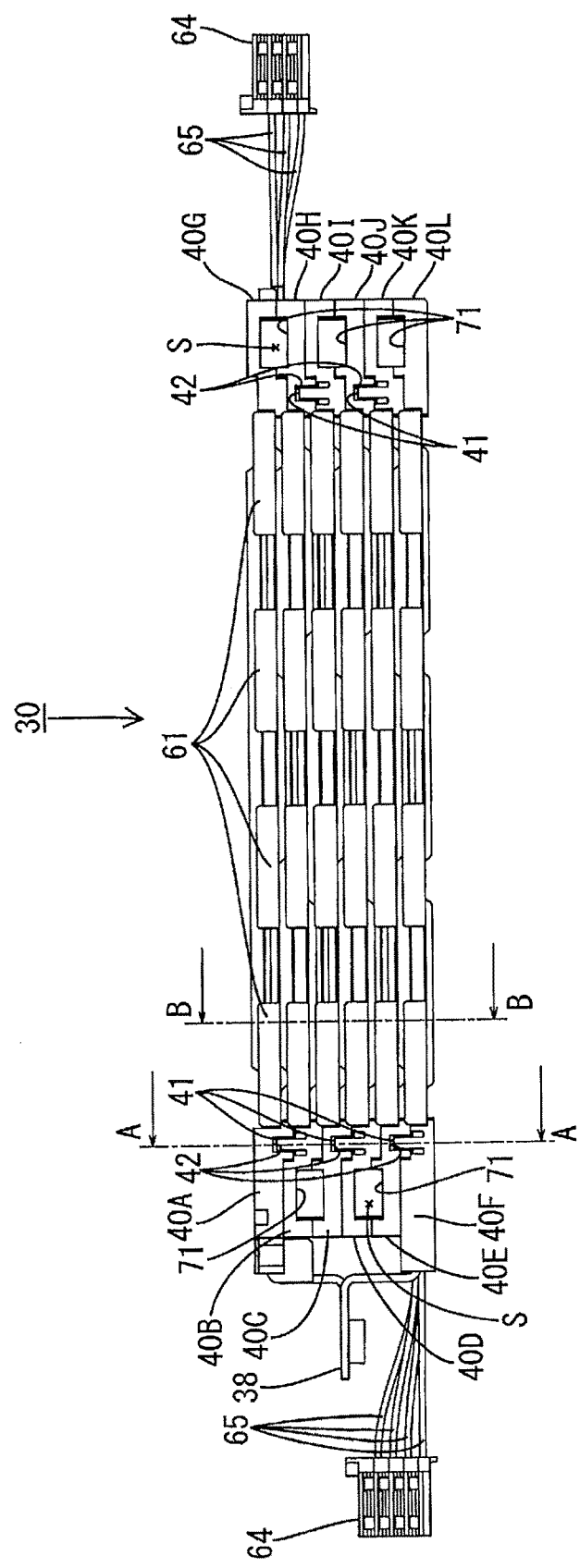
FIG. 4 is a side view of the stack.

As shown in FIGS. 2-4, the stack 30, which is formed by stacking a plurality of electric cells 32, is accommodated in the case 11. In this embodiment, the stack 30 is formed by stacking a plurality of electric cells 32 that are mounted on heat-transfer plates 60 with holder members 40 attached thereto (hereinafter referred to as "electric cell unit 31").

Electric Cells 32

In each electric cell unit 31, as shown in FIG. 3, a pair of widthwise edge portions of the electric cell 32, which has an approximately rectangular shape as seen from the above, are held by the holder members 40 so that the electric cell 32 is mounted on a heat-transfer plate 60 attached to the holder members 40.

Figure 9:
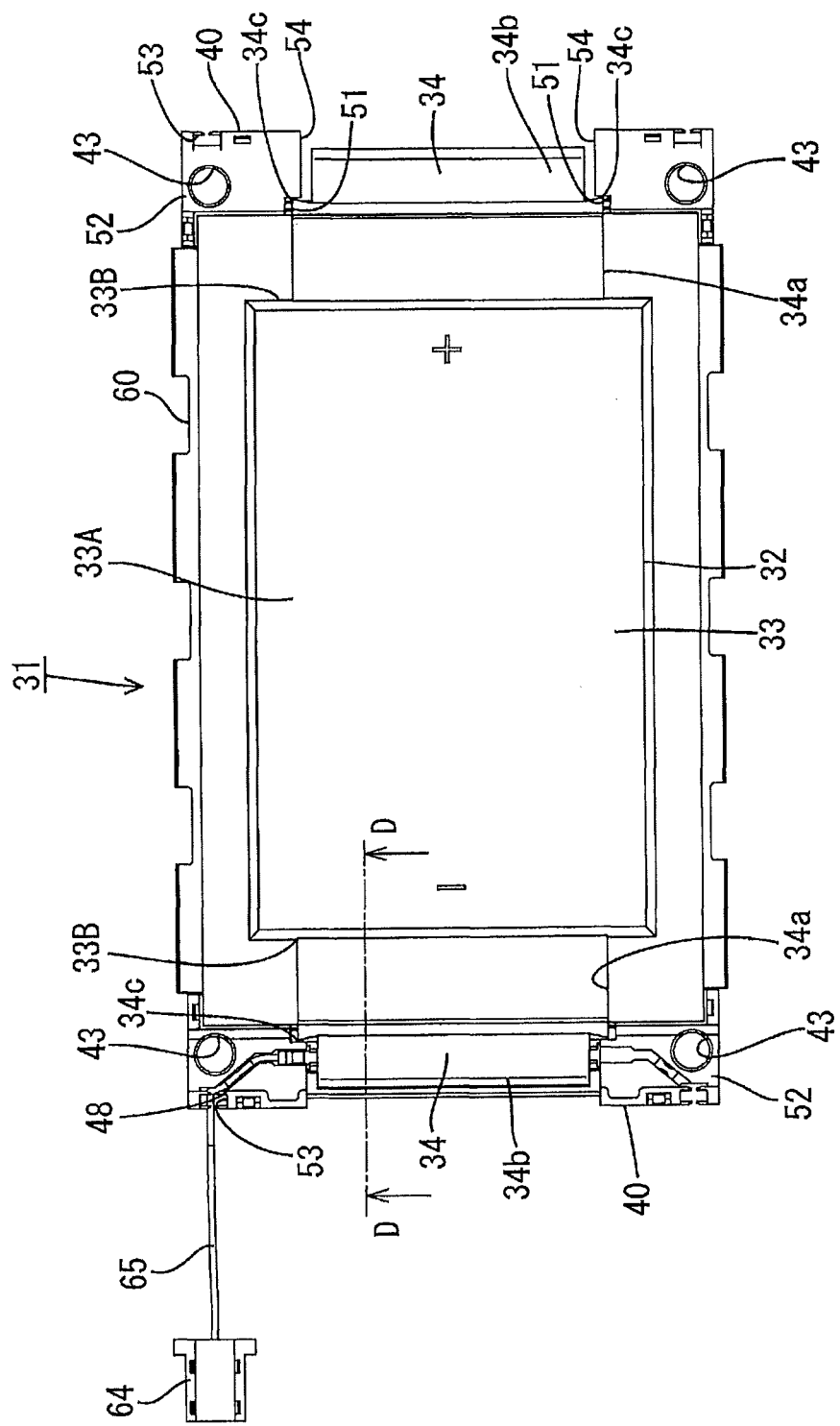
FIG. 9 is a plan view of a battery unit.
Figure 11:
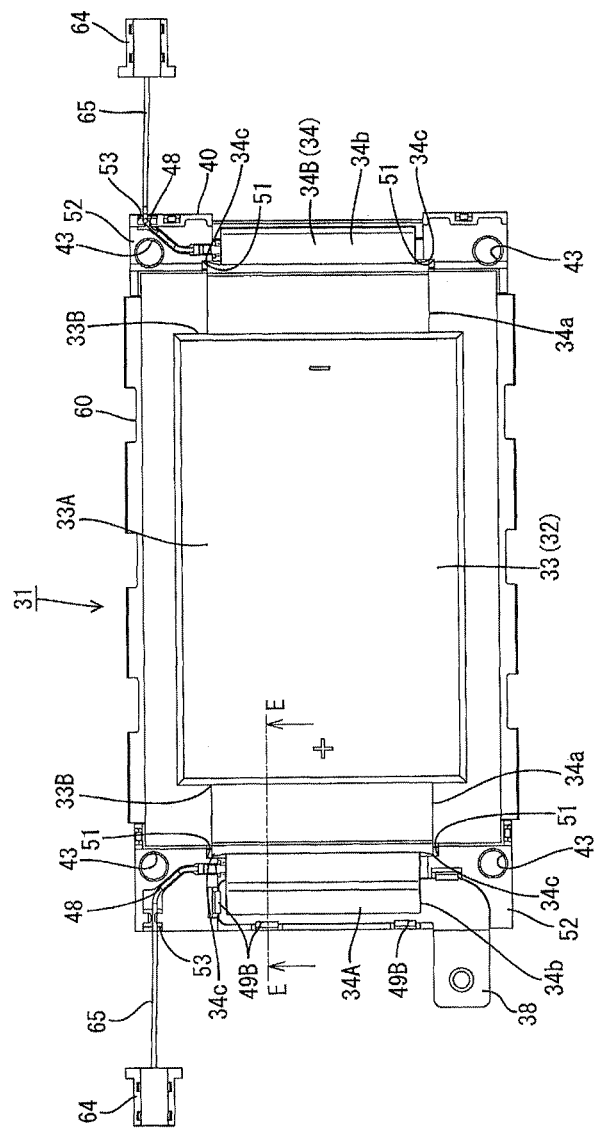
FIG. 11 is a plan view of a battery unit.
Figure 17:
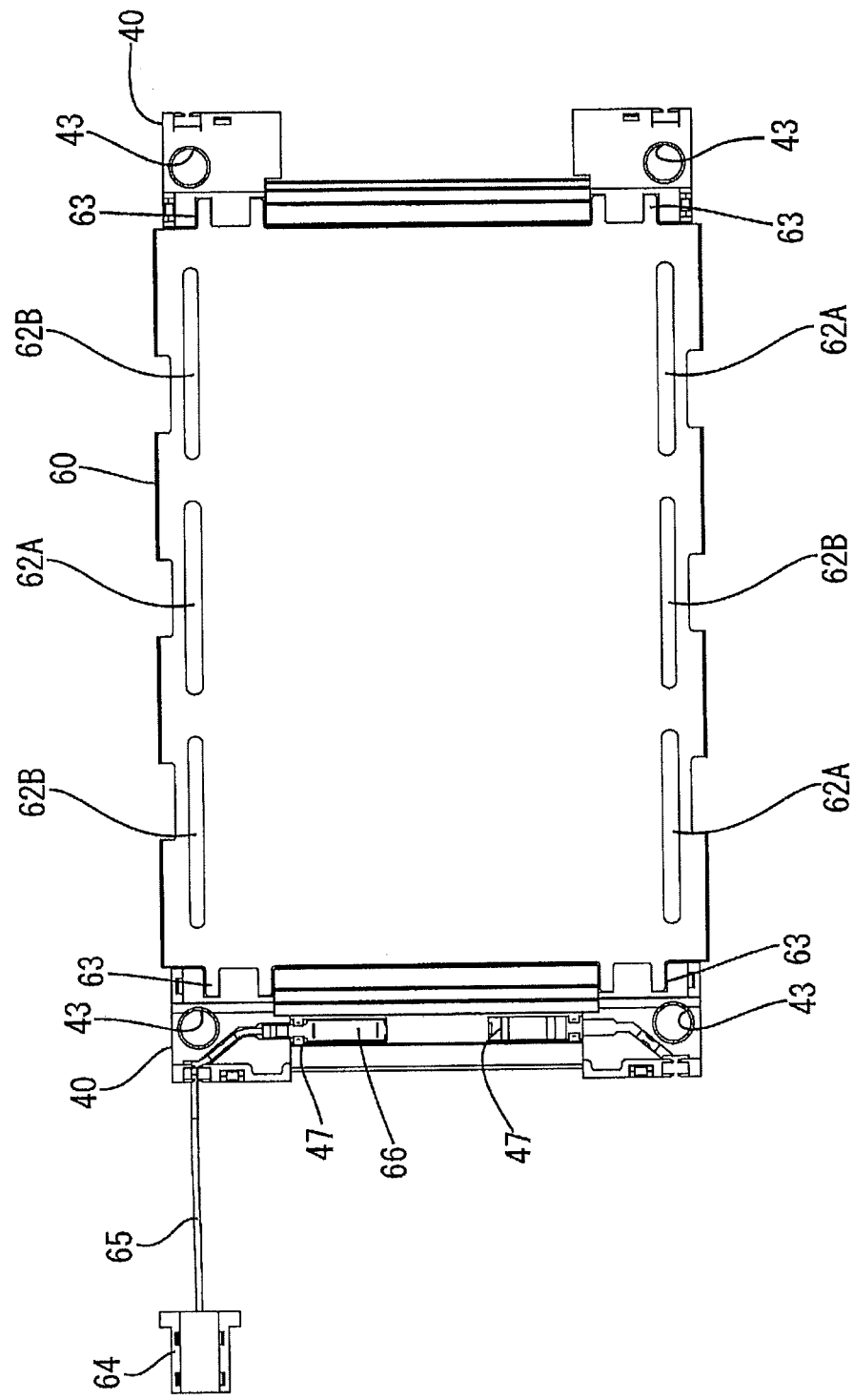
FIG. 17 is a plan view showing a detection terminal mounted on a holder member with a heat-transfer plate attached thereto.
Figure 18:
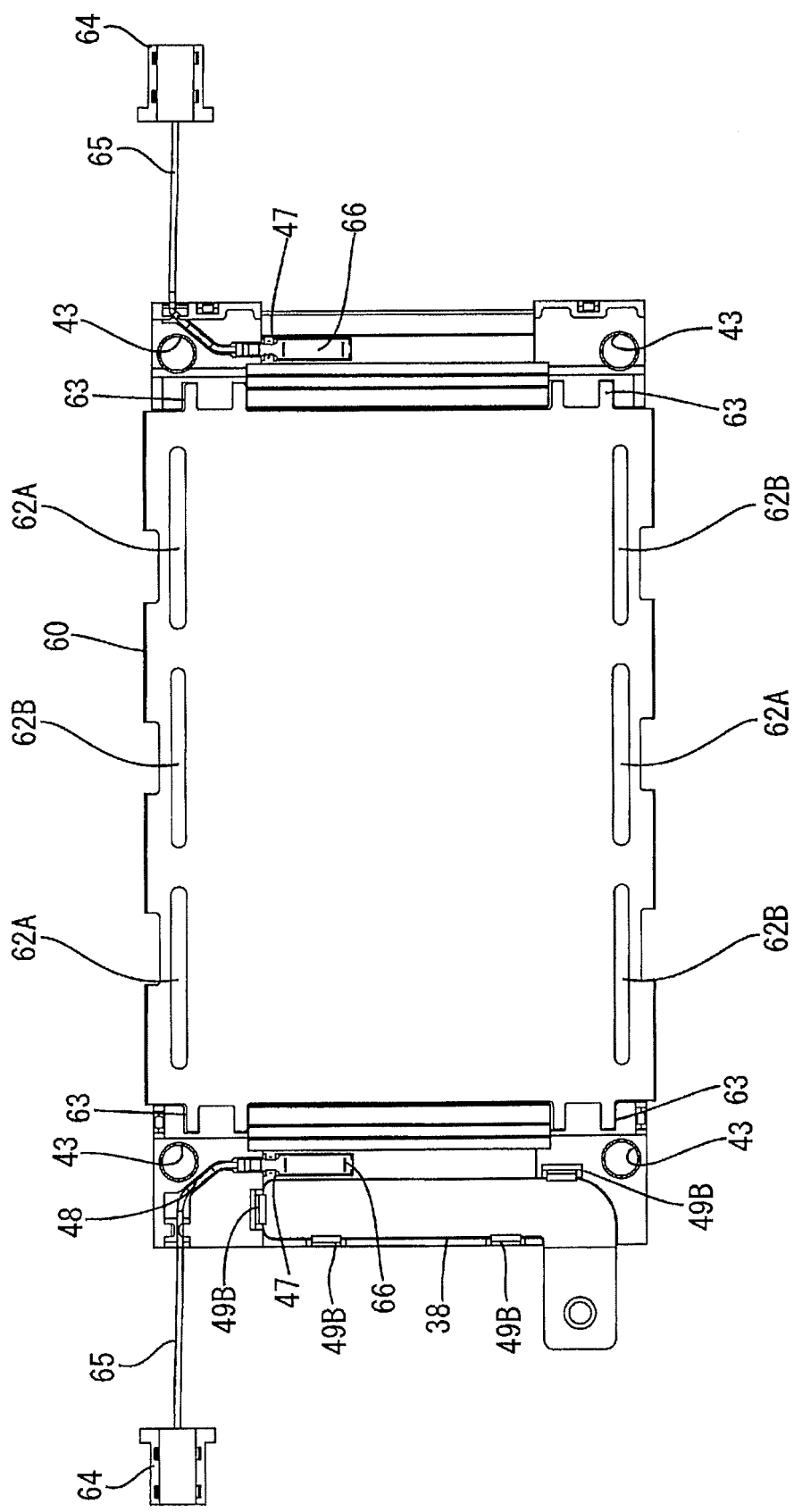
FIG. 18 is a plan view showing detection terminals and a connecting member mounted on holder members with a heat-transfer plate attached thereto.

FIG. 9 is a view showing the third-tier battery unit 31 from the above, FIG. 11 is a view showing the sixth-tier battery unit 31 from the above, FIG. 17 is a view showing the assembly of the third-tier battery unit 31, and FIG. 18 is a view showing the assembly of the sixth-tier battery unit 31.

As shown in FIGS. 9 and 11, the electric cells 32 are disposed approximately in parallel with one another so that the outside surfaces having the largest area, i.e., the sides 33A, face upwards and downwards. This brings the sides 33A, which have the largest area, to contact with the heat-transfer plates 60, thus providing excellent heat dissipation. The electric cells 32 adjacent in the direction of stacking are positioned so that lead terminals 34 with different polarities oppose one another.

Each electric cell 32 is a laminated cell. Each electric cell 32 includes an unillustrated generator element, a laminate film 33 that wraps the generator element and whose end portion 33B are welded, lead terminals 34 connected to the generator element and protruding outward from the opposing welded end portion 33B of the laminate film 33.

Lead Terminals 34

Figure 7:
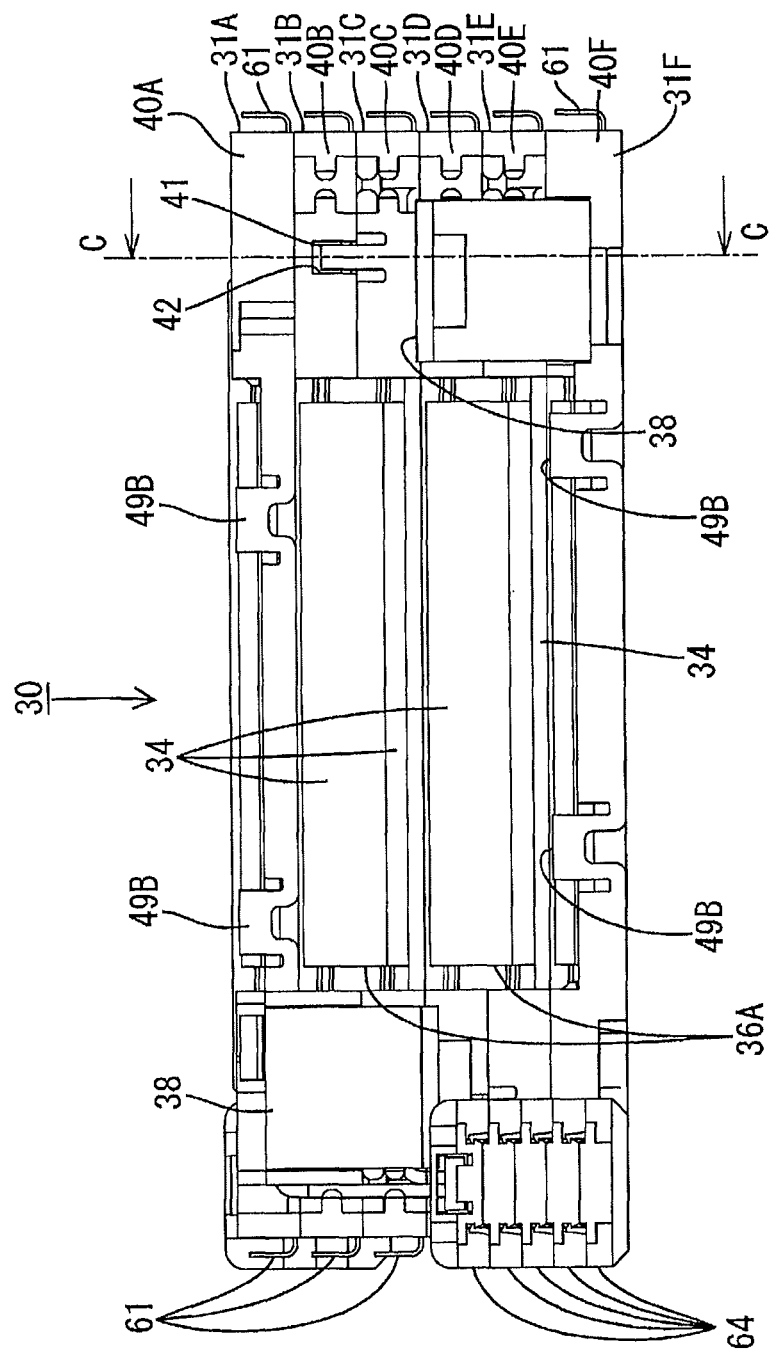
FIG. 7 is a front view of the stack.

The differently polarized lead terminals 34 of the adjacent electric cells 32, except for the negative lead terminal 34 of the top-tier electric cell 32 and the sixth-tier positive lead terminal 34, are bent in opposite directions and connected together by superimposing their end portions so as to bring them in contact with each other and welding the end portions (see FIG. 7).

Figure 10:
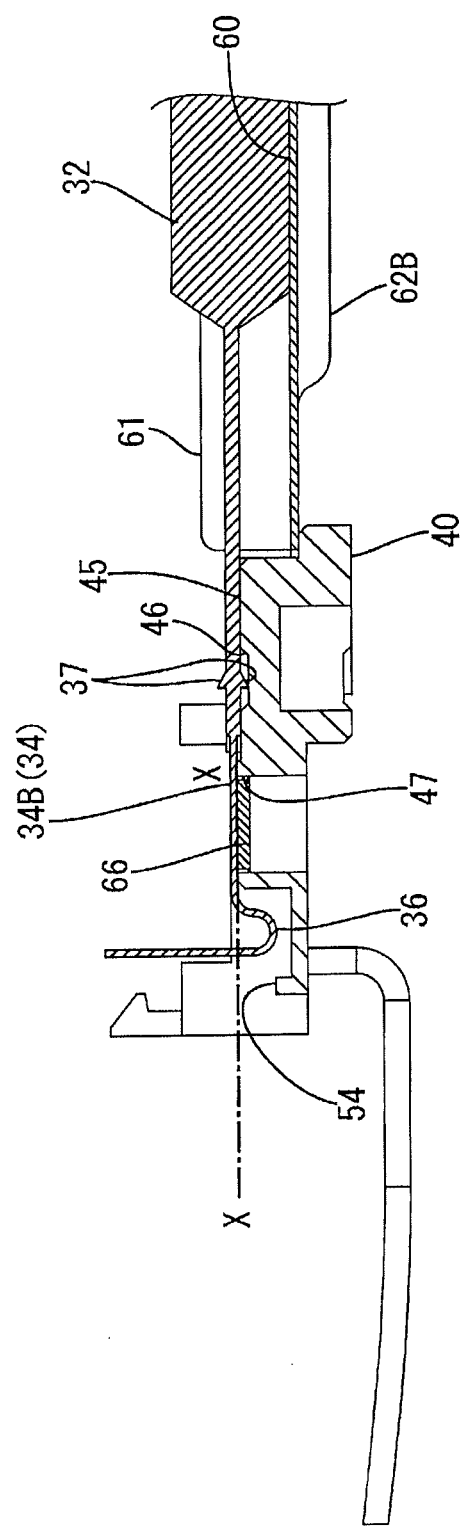
FIG. 10 is a cross-sectional view taken along line D-D of FIG. 9.

More particularly, as shown in FIG. 10, the lead terminal 34B protruding outward front one of the end portions 33B of an electric cell 32 is provided with an arcuate protrusion 36 as seen from the side and then bent approximately vertically upward, forming a J-shaped end portion as seen from the side. The lead terminal 34B protruding from the other end portion 33B (not shown) is provided with an arcuate protrusion 36 as seen from the side and then bent approximately vertically downward, forming a J-shaped end portion as seen from the side. In other words, although not shown in detail, the lead terminal 34B protruding outward from one of the edge portions 33B of the second- to fifth-tier electric cells 32 and the lead terminal 34B protruding outward from the other edge portion 33B are bent in opposite directions from each other.

The lead terminals 34A (the top-tier negative lead terminal 34A and the sixth-tier positive lead terminal 34A), except far the lead terminals 34B (terminal connection terminals) that are connected to the lead terminals 34B of adjacent cell units 32, are formed with a U-shaped protrusion 35 as seen from the side, and the portion of the terminals distal to the U-shaped protrusion 35 (the end portion) is approximately parallel with the direction of protrusion (i.e., has a linear shape).

These lead terminals 34A (the negative lead terminal 34A of the top-tier electric cell 32 and the positive lead terminal 34A of the sixth-tier electric cell 32) are directly superimposed on and con the voltage detection terminals 66 and the busbars 38 ("the busbar connection terminals 34A").

It should be noted that the negative lead terminal 34 of each electric cell 32, although not shown in detail, is directly superimposed on and connected to the voltage detection terminal 66.

The arcuate protrusions 36 formed in the lead terminals 34B are capable of lessening the stress applied to the lead terminals 34B when these lead terminals 34B are welded together. It should be noted that the U-shaped protrusions 35 formed in the lead terminals 34A serve to lessen the stress applied to the lead terminals 34A when connecting the lead terminals 34A and the busbars 38.

Figure 12:
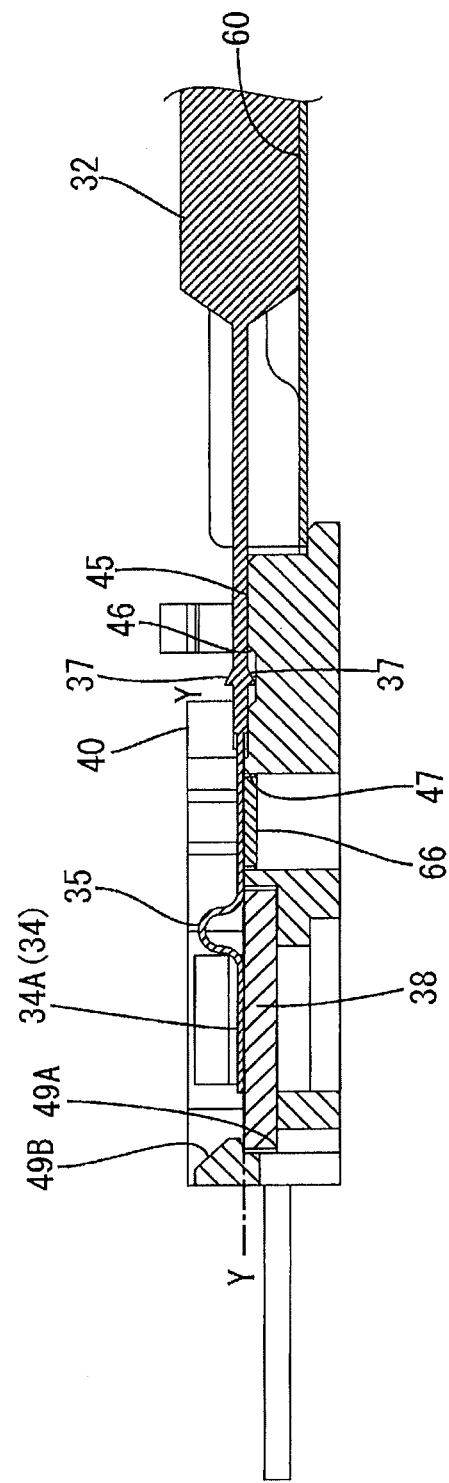
FIG. 12 is a cross-sectional view taken along line E-E of FIG. 11.

It should be noted that in each lead terminal 34, as shown in FIGS. 10 and 12, locking convexes (convex portions) 37 that protrude upward and downward to be locked by the holder members 40 are formed between the edge portions 33B of the laminate film 33 and the protrusions 35, 36.

The regions 34a of the lead terminals 34 on the edge portions 33B of the laminate film are wide regions 34a having a greater width than the distal regions 34b. The corners 34c of the wide regions 34a fit on the cell holder portions 51 of the holder portions 40 to restrict the movement of the electric cell 32.

Busbars 38

The busbar 38 connected to the uppermost electric cell 32 (the second busbar 38B) is a terminal 38B that serves as the anode of the battery module 10, whereas the busbar 38 connected to the lowermost electric cell 32 (the first busbar 38A) is a terminal 38A that serves as the cathode of the battery module 10. Each busbar 38 is made of a conductive material, such as pure aluminum, aluminum alloy, copper, or copper alloy, etc., and the portion 39 drawn out of the busbar draw-out port 29B of the insulation lid portion 26 is the terminal portion 39 for connection to external equipment.

Holder Members 40

Each electric cell 32 is mounted on a heat-transfer plate 60 and held by holder members 40 made of an insulating resin. The holder members 40 are disposed on both sides of the electric cell 32.

In this embodiment, in vertically stacked holder members 40, one of the holder members 40 is provided with engaging protrusions 41 having formed therein locking tabs 41A that protrudes toward the other holder member 40 and also protrudes inward, whereas the other holder member 40 is provided with engagement receiving portions 42 that form a recess for receiving an engaging protrusion 41 and have formed therein a locking protrusion 42A for locking a locking tab 41A. The engaging protrusions 41 and the engagement receiving portions 42 have structures that mutually engage each other. Vertically stacked adjacent holder members 40 engage each other at two locations. This is described more specifically below.

Figure 5:
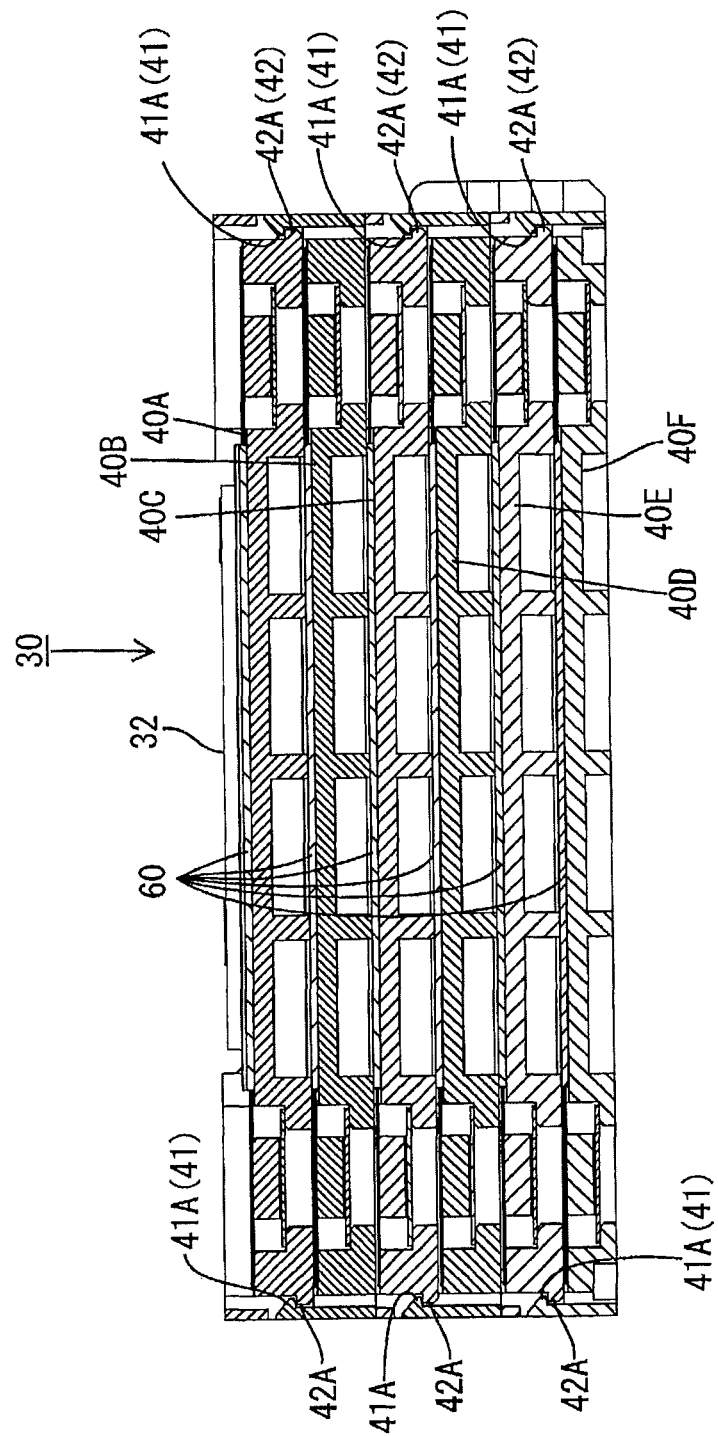
FIG. 5 is a cross-sectional view taken along line A-A of FIG. 4.
Figure 6:
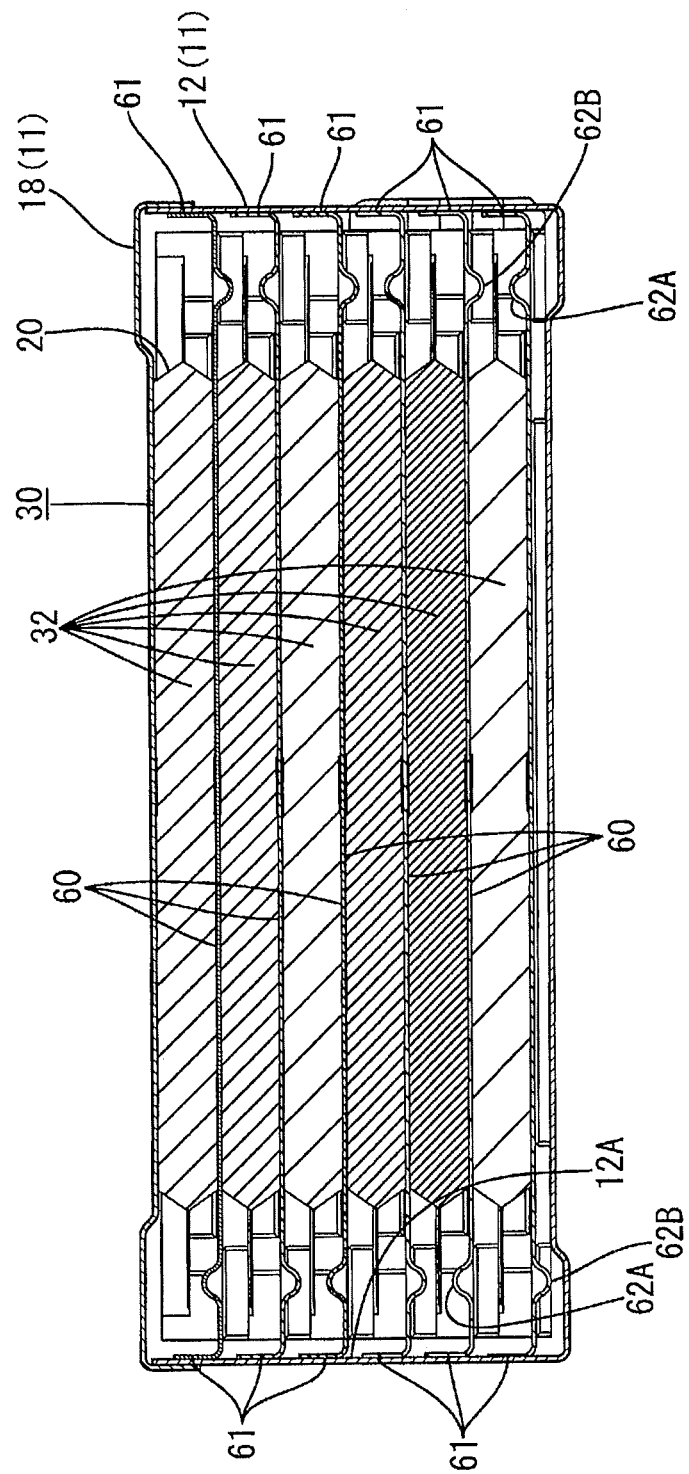
FIG. 6 is a cross-sectional view taken along line B-B of FIG. 4 incorporating the case.

An engaging protrusion 41 is provided in each of the two sides of the holder member 40B disposed at the front of the second tier, whereas an engagement receiving portion 42 for mutually engaging an engaging protrusion 41 provided in the holder member 40B at the front of the second tier is provided in each of the two sides of the holder member 40A disposed at the front of the top tier (see FIGS. 4 and 5).

Figure 8:
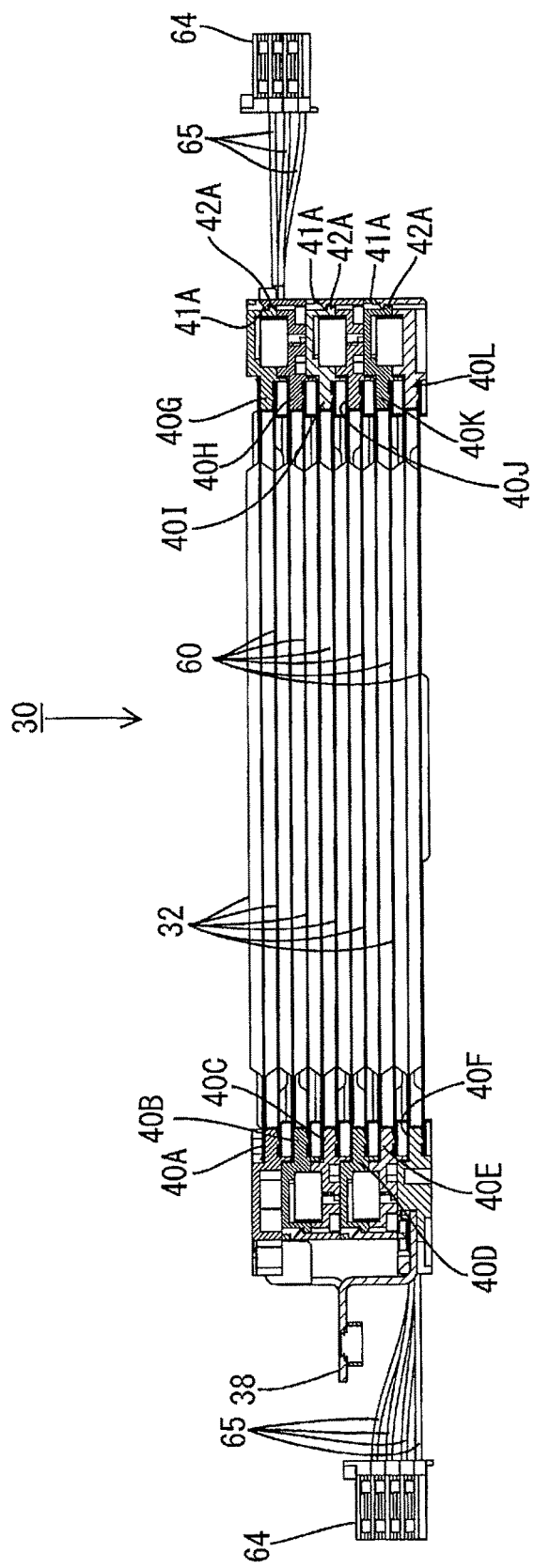
FIG. 8 is a cross-sectional view taken along line C-C of FIG. 7.

Two engaging protrusions 41 are provided in the front side of the holder member 40C disposed at the front of the third tier, whereas engagement receiving portions 42 for mutually engaging the respective engaging protrusions 41 provided in the holder member 40C at the front of the third tier are provided in the front side of the holder member 40B disposed at the front of the second tier (see FIGS. 7 and 8).

An engaging protrusion 41 is provided in each of the two sides of the holder member 40D disposed at the front of the fourth tier, whereas an engagement receiving portion 42 for mutually engaging an engaging protrusion 41 provided in the holder member 40D at the front of the fourth tier is provided in each of the two sides of the holder member 40C disposed at the front of the third tier (see FIGS. 4 and 5).

Two engaging protrusions 41 are provided in the front side of the holder member 40E disposed at the from of the fifth tier, whereas engagement receiving portions 42 for mutually engaging the respective engaging protrusions 41 provided in the holder member 40E at the front of the fifth tier are provided in the front side of the holder member 40D disposed at the front of the fourth tier (see FIGS. 7 and 8).

An engaging protrusion 41 is provided in each of the two sides of the holder member 40F disposed at the front of the sixth tier, whereas an engagement receiving portion 42 for mutually engaging an engaging protrusion 41 provided in the holder member 40F at the front of the sixth tier is provided in each of the two sides of holder member 40E disposed at the front of the fifth tier (see FIGS. 4 and 5).

Two engaging protrusions 41 are provided in the rear side of the holder member 40H disposed at the rear of the second tier, whereas engagement receiving portions 42 for mutually engaging the respective engaging protrusions 41 provided in the holder member 40H at the rear of the second tier are provided in the rear side of the holder member 40G disposed at the rear of the top tier (see FIG. 8).

An engaging protrusion 41 is provided in each of the two sides of the holder member 40I disposed at the rear of the third tier, whereas an engagement receiving portion 42 for mutually engaging an engaging protrusion 41 provided in the holder member 40I at the rear of the third tier is provided in each of the two sides of the holder member 40H disposed at the rear of the second tier (see FIG. 4).

Two engaging protrusions 41 are provided do the rear side of the holder member 40J disposed at the rear of the fourth tier, whereas engagement receiving portions 42 for mutually engaging the respective engaging protrusions 41 provided in the holder member 40J disposed at the rear of the fourth tier are provided in the rear side of the holder member 40I disposed at the rear of the third tier (see FIG. 8).

An engaging protrusion 41 is provided in each of the two sides of the holder member 40K disposed at the rear of the fifth tier, whereas an engagement receiving portion 42 for mutually engaging an engaging protrusion 41 provided in the holder member 40K disposed at the rear of the fifth tier is provided in each of the two sides of the holder member 40J disposed at the rear of the fourth tier (see FIG. 4).

Two engaging protrusions 41 are provided in the rear side of the holder member 40L disposed at the rear of the sixth tier, whereas engagement receiving portions 42 for mutually engaging the respective engaging protrusions 41 provided in the holder member 40L disposed at the rear of the sixth tier are provided in the rear side of the holder member 40K disposed at the rear of the fifth tier (see FIG. 8).

The engaging protrusions 41 of the holder members 40 are adapted to fit into the engagement receiving portions 42 of the holder members 40 set on those holder members 40. When the plurality of the holder members 40 are stacked in an engaging state, the engaging protrusions 41 and the engagement receiving portions 42 are both adapted not to protrude outward from the holder members 40, thus saving space.

Additionally, in this embodiment, when the plurality of battery units 31 are stacked together as shown in FIGS. 2 and 8, spaces S are formed between the vertically adjacent holder members 40 as shown in FIG. 4.

More specifically, both of the under of the holder member 40B, which is disposed at the front of the second tier, and the top surface of the holder member 40C, which is disposed at the front of the third tier, are recessed such that when these two holder members 40B and 40C are stacked together, space S is created between the holder members 40B and 40C, extending in approximately parallel with the widthwise direction of the laminate films 33 of the electric cells 32.

Similarly, space S is created between the holder member 40D disposed at the front of the fourth tier and the holder member 40E disposed at the front of the fifth tier, between the holder member 40G disposed at the rear of the top tier and the holder member 40H disposed at the rear of the second tier, between the holder member 40I disposed at the rear of the third tier and the holder member 40J disposed at the rear of the fourth tier, and between the holder member 40K disposed at the rear of the fifth tier and the holder member 40L disposed at the rear of the sixth tier.

Disposed in spaces S between the vertically adjacent holder members 40 are the connected portions 36B between the vertically adjacent lead terminals 34B of different polarities. Jigs (not shown) for welding the adjacent lead terminals 34B of different polarities can be inserted into spaces S. Insertion ports 71 at which the jigs are inserted into spaces S are provided in the fore sides and the hind sides of the holder members 40 shown in FIG. 2.

Each holder member 40 is provided with two through-holes 43 through which first fixing members can be passed.

Provided on the top surface of each holder member 40 is a terminal mount 45 for mounting and holding the lead terminal 34, and the terminal mount 45 is provided with a locking groove 46 for receiving and locking an locking convex 37 of the lead terminal 34 (see FIGS. 10-12). The locking groove 46 serves to lock the lead terminal 34 to position the electric cell 32.

Formed adjacent to the terminal mount 45 of each holder member 40 are thick regions 52 having a greater thickness dimension than the terminal mount 45, and the thick regions 52 are formed with recessed cell holder portions 51 into which the corners 34c of the wide region 34a of the lead terminal 34 are fitted. These cell holder portions 51 restrict the movement of the lead terminal 34 (the electric cell 32).

Additionally, in this embodiment, heat-transfer plate locking portions 44 (an example of engaging portions) are provided in opposing positions (two in total) of the under surface of each holder member 40 for mutually engaging the locking holes 63A (an example of engaged portions) in the heat-transfer plate 60 (see FIGS. 13-16).

Figure 15:
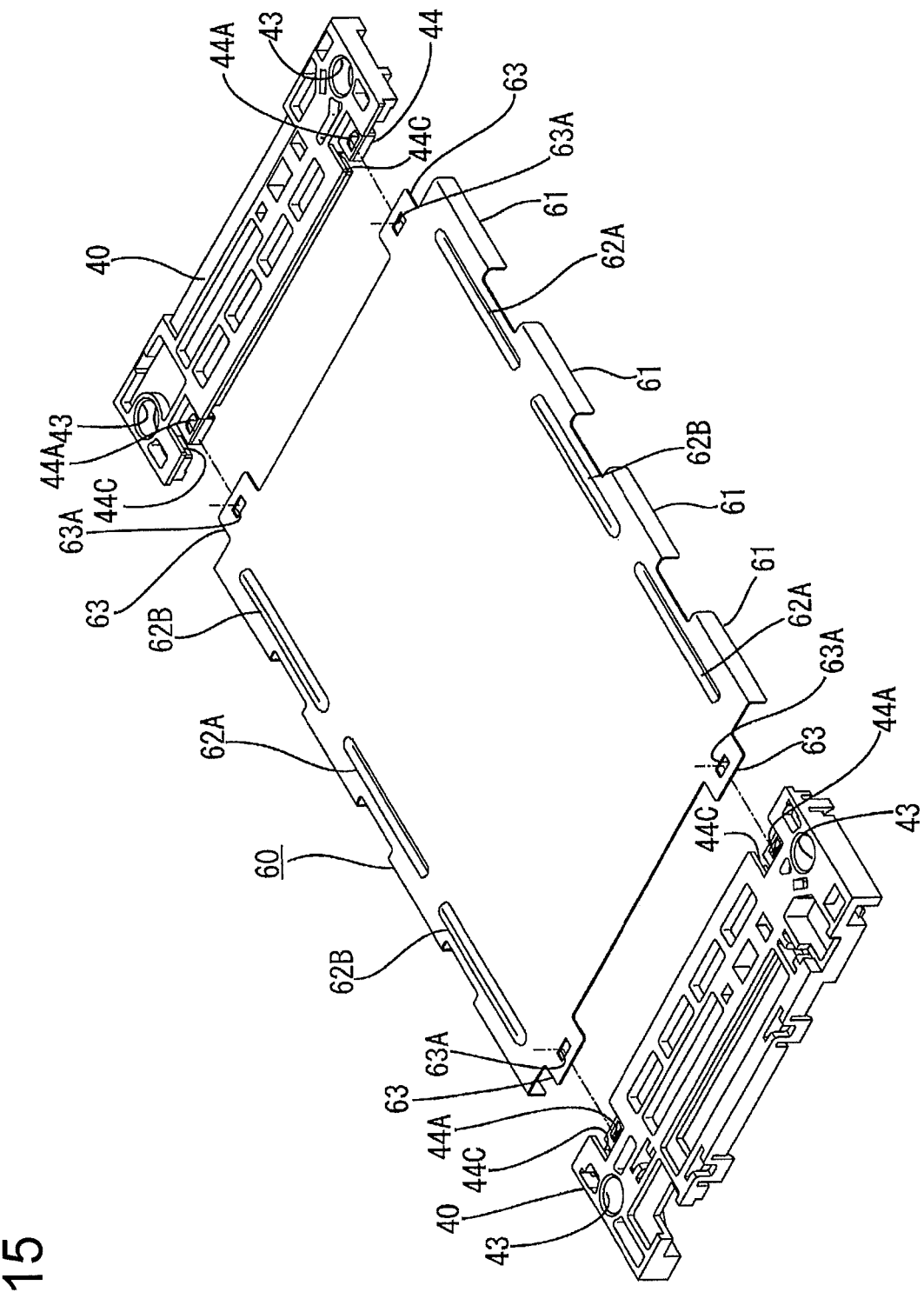
FIG. 15 is a perspective bottom view showing attachment of a heat-transfer plate to holder members.
Figure 16:
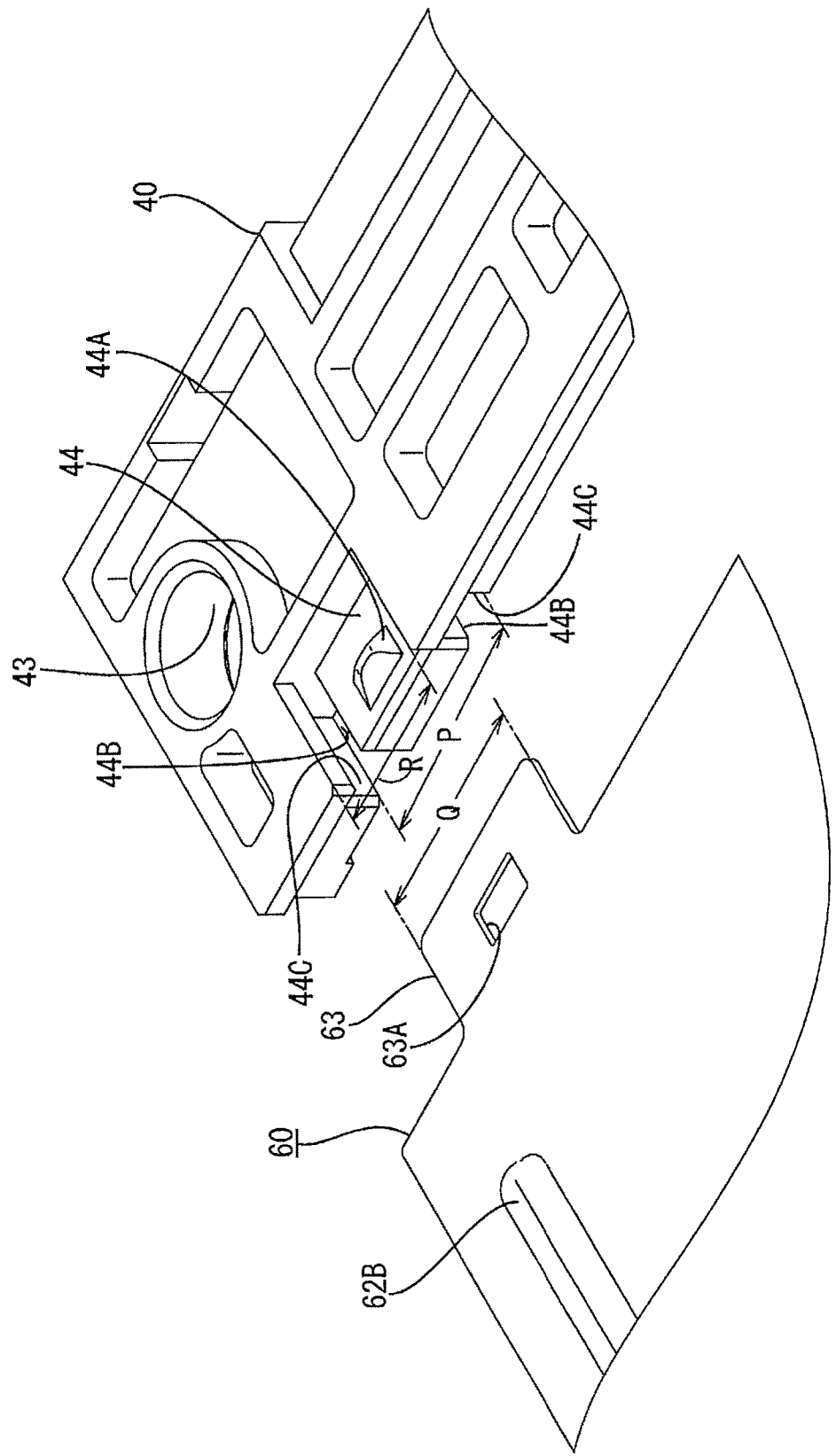
FIG. 16 is an enlarged perspective view of a relevant portion of FIG. 15.

As shown in FIGS. 15 and 16, the heat-transfer plate locking portions 44 are provided by partially cutting out square portions of the under surfaces of holder members 40. The heat-transfer plate locking portions 44 are formed with slits 44B on both sides thereof and have a structure that can deform vertically. Heat-transfer plate locking protrusions 44A that protrude downward (where the heat-transfer plate is disposed) are formed on the square-shaped heat-transfer plate locking portions 44 in proximity to the end portions thereof.

The end faces 44C of a holder member 40 separated by the slits 44B are stepped so that by moving protruding lugs 63 of the heat-transfer plate 60 along stepped end faces 44C, the protruding lugs 63 of the heat-transfer plate 60 are slidably mounted on the holder member 40 (an example of slide portions).

As shown in FIG. 16, the distance between the opposing stepped end faces 44C at the upper end of the holder member 40 (indicated by "P" in the lower plane in FIG. 16) is set slightly greater than the width dimension Q of the protruding lug 63 of the heat-transfer plate 60, while the distance at the lower end (indicated by "R" in the upper plane in FIG. 16) is smaller than the width dimension Q of the protruding lug 63 of the heat-transfer plate 60. In other words, when attached to a holder member 40, the protruding lugs 63 of a heat-transfer plate 60 are held between the lower surface of the holder member 40 and the heat-transfer plate locking portions 44 of the holder member 40 (see FIG. 14).

Formed in the holder members 40C, 40E, 40H, and 40J are insulating wall portions 54 that surround the peripheries of the connected portions 36A formed by connecting lead terminals 34 and prevent any connected portion 36A from coming into contact with other connected portions 36A or other lead terminals 34 to provide insulation see FIG. 2, etc.).

Also formed in each of the holder members 40A, 40C, 40E, 40F, 40H, 40J, and 40L is a terminal holder portion 47 for holding a voltage detection terminal 66 and a wire accommodating groove 48 for accommodating a wire 65 connected to the voltage detection terminal 66. A crimped portion 65A of the wire 65 crimped by the voltage detection terminal 66 is also held in the wire accommodating groove 48.

As shown in FIGS. 10 and 12, the voltage detection terminal 66 held in the terminal holder portion 47 of each the holder members 40A, 40C, 40E, 40F, 40H, 40J, and 40L is positioned to have its upper surface (one surface) aligned with the under surface of the lead terminal 34 (an example of a surface) (on the X-X or the Y-Y line).

Furthermore, each of the holder members 40A and 40F is also provided with a busbar holder portion 49 (an example of a connecting member holder portion) holding the corresponding busbar 38. Formed in the busbar holder portion 49 are a recess 49A in which the busbar 38 is fitted and a plurality of retainer protrusions 49B that prevent the busbar 38 fitted in the recess 49A from slipping out.

As shown in FIG. 12, each busbar 38 held in the busbar holder portions 49 of the holder members 40A and 40F is positioned to have its upper surface (one surface) aligned with the under surface of the lead terminal 34 (an example of a surface) (on the Y-Y line).

Each holder member 40 is formed with a wire passage portion 53 for passing the wire 65 attached to that holder member 40 or a different holder member 40. All the wire passage portions 53 of the holder members 40 except for the one in the holder member 40G disposed at the rear of the top tier are grooves formed by cutting out portions of the holder members 40 and contained within the case 11. The wire passage portion 53 of the holder member 40G, however, is configured to protrude out of the case 11 from the wire draw-out hole formed at the top end of the rear side of the main case body 12. A plurality of wires 65 are drawn out of the case 11 through the wire passage portion 53 of the holder member 40G.

In the holder members 40F and 40L disposed at the sixth tier, only one locking groove 46 is provided in the top surface. In the other holder members 40, however, locking grooves 46 are provided on both of the top and under surfaces.

Additionally, provided in the holder member 40G disposed at the rear of the top tier are locking holes 50A that lock a stack holder member (not shown) and a mounting recess 50B that receives the stack holder member. The stack holder member is disposed between the connected portions 36A of the lead terminal 34 arranged at the rear end of the stack 30 and the case 11 to insulatively protect the lead terminals 34.

Heat-Transfer Plates 60

In this embodiment, the adjacent electric cells 32 are interleaved with heat transfer plates 60 made of a heat conductive material. In this embodiment, aluminum or aluminum alloy, which has superior heat conductivity, is used as the heat conductive material. As shown in FIG. 2, four upright walls 61 are vertically erected at intervals on the pair of longitudinal side edges of each heat-transfer plate 60. These upright walls 61 are heat conductive walls 61 positioned to come into contact with the inner wall surfaces of the case 11 when the stack 30 is accommodated in the case 11 so as to conduct the heat generated by the electric cells 32 to the case 11. The heat generated by the electric cells 32 is conducted to the case 11 via the heat conductive walls 61 and released to the outside of the case 11.

Figure 13:
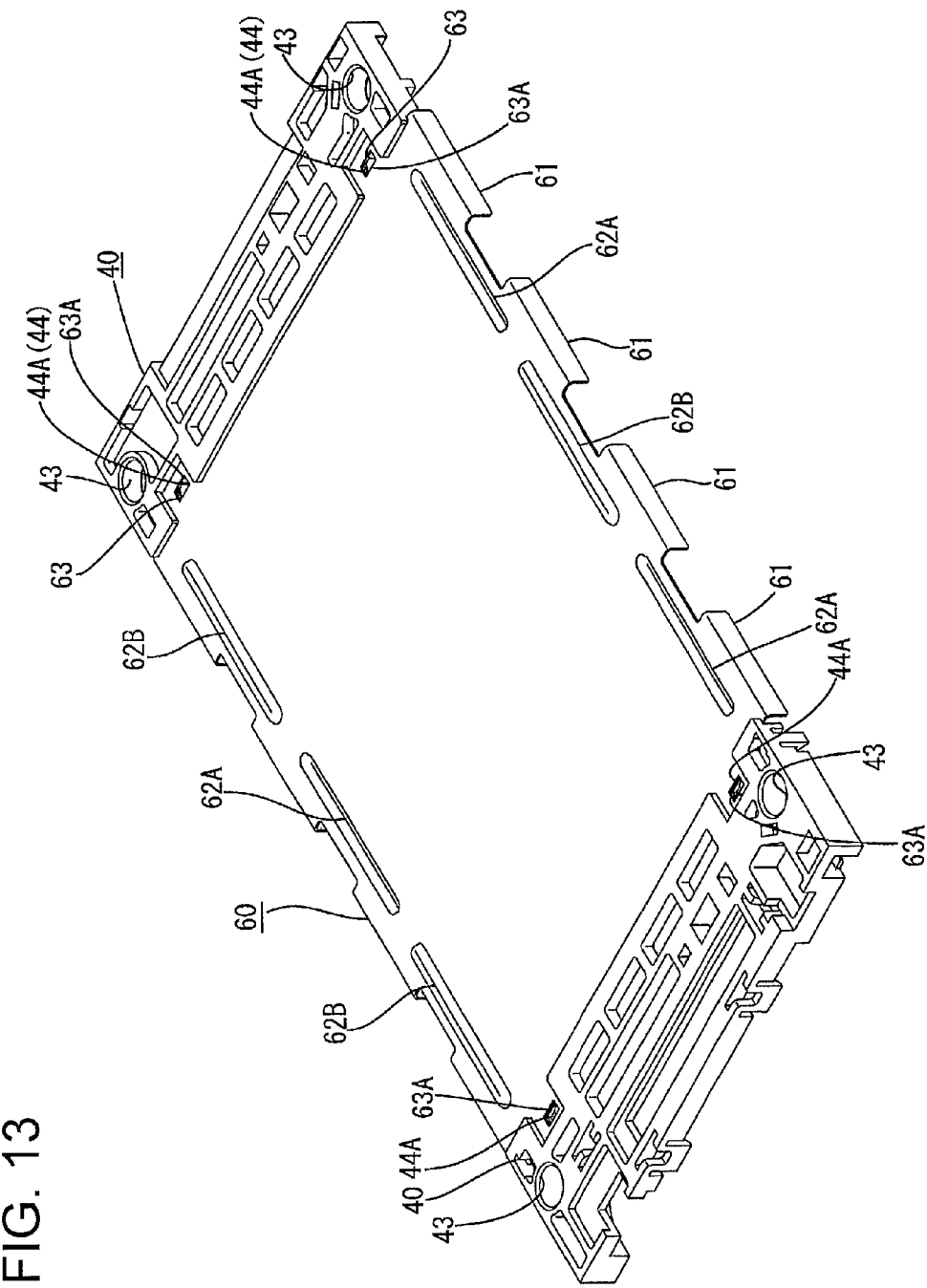
FIG. 13 is a perspective bottom view showing a heat-transfer plate attached to holder members.
Figure 14:
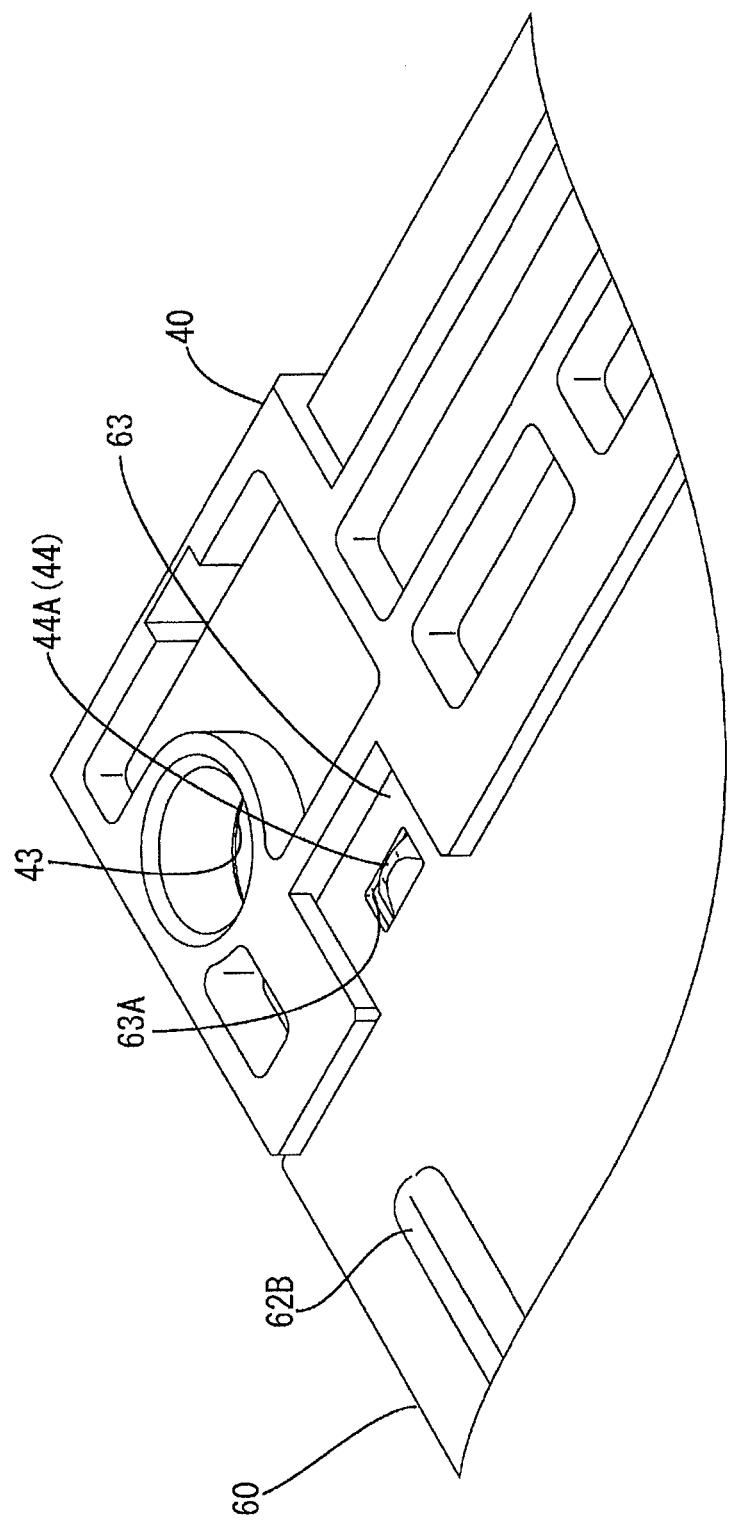
FIG. 14 is an enlarged perspective view of a relevant portion of FIG. 13.

As shown in FIG. 13, convex portions 62A that protrude downward as seen in FIG. 13 and concave portions 62B that protrude upward as seen in FIG. 13 are alternately formed inside of the pair of longitudinal side edges of the heat-transfer plate 60, both extending approximately in parallel to the longitudinal side edges. Although the metallic cladding material disposed within the laminate film 33, which covers the electric unit 32, is at times exposed at an edge of the laminate film 33, the convex, portions 62A and the concave portions 62B formed on the heat-transfer plate 60 prevent the edge of the laminate film 33 of the electric cell 32 from coming into contact with the heat-transfer plate 60. This prevents shorting of the electric cell 32.

As shown in FIGS. 13-16, the heat-transfer plates 60 have on both widthwise edges two protruding lugs 63 (four altogether) that are formed with approximately rectangular locking holes 63A. The protruding lags 63 are provided at opposing positions. The protruding lugs 63 are slidably mounted by being moved along the end faces 44C (the slide portions 44C) of the holder members 40. The heat-transfer plate locking protrusions 44A of the holder members 40 are adapted to fit into the locking holes 63A formed in the protruding lugs 63 to engage each other.

Assembly of the Battery Module 10 of the Embodiment

The following describes how to assemble the battery module 10 of this embodiment. A total of six electric cells 32 having lead terminals 34 of predetermined shapes are prepared.

Holder portions 40 are attached to the end portions of corresponding six heat-transfer plates 60. More particularly, a heat-transfer plate 60 with a holder member 40A and a holder member 40G attached thereto, a heat-transfer plate 60 with a holder member 40B and a holder member 40H attached thereto, a heat-transfer plate 60 with a holder member 40C and a holder member 40I attached thereto, a heat-transfer plate 60 with a holder member 40D and a holder member 40J attached thereto, a heat-transfer plate 60 with a holder member 40E and a holder member 40K attached thereto, and a heat-transfer plate 60 with a holder member 40F and a holder member 40L attached thereto are prepared.

A holder member 40 is attached to a heat-transfer plate 60 as below. The protruding lugs 63 of the heat-transfer plate 60 are inserted between the opposing stepped end faces 44C of the holder member 40, and the heat-transfer plate 60 is then slidably moved with respect to the holder member 40. When the protruding lugs 63 of the heat-transfer plate 60 abut against the heat-transfer plate locking protrusions 44A, the heat-transfer plate locking portions 44 are deformed outward. When the heat-transfer plate looking protrusions 44A of the holder member 40 are fitted into the locking holes 63A of the heat-transfer plate 60 by further slidably moving the heat-transfer plate 60 with respect to the holder member 40, the heat-transfer plate locking portions 44 elastically return, causing the protruding lugs 63 of the heat-transfer plate 60 to be sandwiched between the under surface of the holder member 40 and the heat-transfer plate locking portions 44, thus integrating both members 40 and 60.

Next, voltage detection terminals 66 with connectors 64 attached thereto and busbars 38 are mounted on predetermined positions of the heat-transfer plates 60, to each of which two holder members 40 are attached.

In particular, the wires 65 connected to the connectors 64 are placed in the wire accommodation grooves 48 of the holder members 40A, 40C, 40E, 40H, 40J, 40F, and 40L, whereas a busbar 38 is mounted on the busbar holder portion 49 of each of the holder members 40A and 40F (see FIGS. 17 and 18).

A wire 65 connected to a connector 64 may be attached by fitting and mounting the voltage detection terminal 66 into the terminal mounting portion 47 of a holder members 40 and placing the wire 65 in the wire accommodating groove 48.

The busbars 38 are attached as described below. By inserting a busbar 38 into the recess 49A of a busbar holder portion 49, the busbar 38 is brought into abutment with the retainer protrusions 49B, causing the retainer protrusions 49B to deform outward. Once the busbar 38 is fitted in the recess 49A, the retainer protrusions 49B elastically return to restrict the upward movement of the busbar 38 and prevents it from slipping out.

Next, the electric cells 32 are mounted on the heat-transfer plates 60.

The top-tire battery unit 31A is obtained by mounting an electric cell 32 on the heat-transfer plate 60 to which the holder member 40A and the holder member 40G are attached. The second-tire battery unit 31B is obtained by mounting an electric cell 32 on the heat-transfer plate 60 to which the holder member 40B and the holder member 40H are attached. The third-tire battery unit 31C is obtained by mounting an electric cell 32 on the heat-transfer plate 60 to which the holder member 40C and the holder member 40I are attached. The fourth-tire battery unit 31D is obtained by mounting an electric cell 32 on the heat-transfer plate 60 to which the holder member 40D and the holder member 40J are attached. The fifth-tire battery unit 31E is obtained by mounting an electric cell 32 on the heat-transfer plate 60 to which the holder member 40E and the holder member 40K are attached. The sixth-tire battery unit 31F is obtained by mounting an electric cell 32 on the heat-transfer plate 60 to which the holder member 40F and the holder member 40L are attached.

To mount an electric cell 32 on a heat-transfer plate 60, the locking portions 37 of the lead terminals 34 are fitted into the locking grooves 46 of the terminal mounts 45, and the corners 33c of the lead terminal 14 are fitted on the cell holder portions 51 of the holder members 40. In this way, as the lead terminals 34 of the electric cell 32 are locked by the locking grooves 46, the electric cell 32 is prevented from being displaced and the movement of the electric cell 32 is restricted by the cell holder portions 51.

The insulating wall portions 54 of the holder members 40 are arranged on the edges of the connected portions 36A between the adjacent lead terminals 34, thus holding the connected portions 36A between the adjacent lead terminals 34 in an insulated state.

In each battery unit 31, the upper surface of the voltage detection terminal 66 held in the terminal holder portion 47 of each holder member 40 is aligned with the under surface of the lead terminal 34 of the electric cell 32 so that the voltage detection terminal 66 is in surface contact with lead terminal 34 (see FIGS. 10 and 12). In particular, in the battery units 31A and 31F, the upper surface of the voltage detection terminal 66 held in the terminal holder portion 47 of each holder member 40, the upper surface of the busbar 38, and the under surface of the lead terminal 34 of the electric cell 32 are aligned with each other so that the voltage detection terminal 66 and the busbar 38 are in surface contact with lead terminal 34 (see FIG. 12).

The battery wilts 31 are obtained when the voltage detection terminals 66 and the busbars 38 are joined to the lead terminals 34 by laser welding.

The six battery units 31 are stacked in order, starting with the lowermost tier. The battery units 31 are stacked together by aligning the engagement receiving portions 42 of the holder members 40 at the second lowest tier (the fifth tier) with the engaging protrusions 41 formed on the holder members 40 at the lowermost tier (the sixth tier).

When an upper holder member 40 is moved downward, the engaging protrusions 41 fit into the engagement receiving portions 42, and when the locking tabs 41A of the engaging protrusions 41 abut against the locking protrusion 42A in the engagement receiving portions 42, the movement of the engaging protrusions 41 is restricted and the engaging protrusions 41 and the engagement receiving portions 42 mutually engage each other.

Once the six battery units 31 are stacked by repeating the same process, between vertically adjacent holder members 40, the engaging protrusions 41 of one holder member 40 mutually engage the engagement receiving portions 42 of the other holder member 40 to integrate each other, thus providing a stack 30 as shown in FIG. 2. Then, the through-holes 43 in the six tiers of stacked holder members 40 are aligned with one another to provide continuous through-holes while spaces S are formed between the adjacent holding members 40. When the battery units 31 are stacked, the connectors 64 are also stacked and integrated.

Next, welding jigs are inserted into spaces S through the insertion ports 71 between the vertically adjacent holding members 40 to join together the end portions (the liner portions) of the pairs of vertically adjacent lead terminals 34B. The overlapping end portions of the pairs of lead terminals 34B are pinched between a pair of jigs inserted transversely across the direction in which the lead terminals 34 protrude, and the adjacent lead terminals 34B of different polarities are joined together by applying a laser beam for welding.

The stack holder member is attached to the rear end of the stack 30 thus obtained in order to hold the stack 30 together.

Subsequently, the connector-attached wires 65 drawn out of the rear of the stack 30 are drawn out through the wire draw-out hole formed in the upper end of the rear side of the main case body 12, thus accommodating the stack 30 in the main case body 12. Once the stack 30 is accommodated in the main case body 12, the heat conductive walls 61 are positioned to come into contact with the inner wall surfaces 12A.

The insulation lid portion 26 is then fitted on the opening at the front of the main case body 12. More specifically, the connector-attached wires 65 drawn out of the front of the stack 30 are drawn out through the cutout 29A in the insulation lid portion 26, and the busbars 38 are drawn out of the busbar draw-out ports 29B in the insulation lid portion 26 so as to mount the insulation lid portion 26 on the main case body 12. Subsequently, when the lid portion 18 is set to cover the top of the main case body 12, the battery module 10 shown in FIG. 1 is obtained.

Next, with the first fixing members passed through the through-holes 43 of the holding members 40 at the ends of the stack 30 between the lid portion 18 and the bottom wall of the main case body 12, the fixing holes 21 of the lid portion 18, the hollow first fixing members, and the fixing holes in the bottom wall of the main case body 12 are inserted into unillustrated jigs for alignment and then the lid portion 18 and the main case body 12 are fastened with screws or pins. This completes the assembly of the battery module 10.

Operation and Effects of the Embodiment

The operation and effects of this embodiment will be described hereinafter.

In this embodiment, the heat-transfer plates 60 and the holder members 40 are integrated through mutual engagement between the heat-transfer plate locking protrusions 44A formed on the holder members 40 and the locking holes 63A caned in the heat-transfer plates 60. Accordingly, the heat-transfer plates 60 and the holder members 40 can be integrated by engaging the heat-transfer plate locking protrusions 44A formed on the holder members 40 with the locking holes 63A formed in the heat-transfer plates 60. As a result, according to this embodiment, a battery module 10 with improved heat dissipation can be provided that also prevents shorting due to contact with the lead terminals 34, etc. Furthermore, according to this embodiment, as the holder members 40 are formed with slide portions 44C on which a heat-transfer plate 60 are slidably mounted, the heat-transfer plate 60 and the holder members 40 can be integrated more efficiently.

Furthermore, according to this embodiment, as a plurality of heat-transfer plate locking protrusions 44A and a plurality of locking holes 63A are provided in opposing positions, a heat-transfer plate 60 is attached to holder members 40 at a plurality of opposing positions to reliably prevent displacement of it members.

Moreover, according to this embodiment, a case 11 that accommodates a stack 30, holder members 40, and heat-transfer plates 60 are provided, and the heat-transfer plates 60 are provided with heat conductive walls 61 in contact with the inner wall surfaces 12A of the case 11 to conduct the heat generated by the electric cells 32 to the case 11. Accordingly, the heat generated by the electric cells 32 is conducted to the case 11 via the heat conductive walls 61 to provide excellent heat dissipation.

Furthermore, according to this embodiment, among the plurality of electric cells 32, the electric cell 32 disposed at one end (the top end) in the stacking direction is positioned in contact with an inner wall surface 12A of the case 11. Accordingly, the heat generated by the electric cell 32 disposed at that end in the stacking direction is conducted to the inner wall surface 12A of the case 11 to be dissipated to the outside of the case 11, thus further improving the heat dissipation.

Other Embodiments

The present invention is not limited to the embodiments described in connection with the foregoing description and drawings. For example, the following embodiments also fall under the technical scope of the present invention.

(1) Although to foregoing embodiment is shown to have a configuration in which holder members 40 are attached to both ends of the electric cells 32, which are provided with the lead terminals 34 on both ends thereof, other configurations are possible. A configuration in which a lead terminal is provided on one end of the electric cells and a holder member is attached only to the one end of the electric cells on which a lead terminal is provided will be sufficient. Or a configuration in which a lead terminal is provided on one end of each electric cell and holder members are attached to both ends of the electric cells will also be sufficient.

(2) Although the foregoing embodiment shows an example in which engaging portions 44A and engaged portions 63A are provided at a plurality of opposing positions, provision of one engaging portion and one engaged portion may also suffice.

(3) Although the foregoing embodiment shows holder members 40 formed with slide portions 44C on which heat-transfer members 60 are slidably mounted, the holder members may not have slide portions.

(4) Although the foregoing embodiment shows heat-transfer plates 60 provided with heat conductive walls 61 that come into contact with the inner wall surfaces 12A of the case 11, heat-transfer plates without heat conductive walls may also suffice.

(5) Although the foregoing embodiment shows a configuration in which, among the electric cells 32 that comprise the stack 30, the electric cell 32 disposed at the top end in the stacking direction is positioned in contact with an inner wall surface 12A of the case 11, the electric cell disposed at the bottom end in the stacking direction may be in contact with an inner wall surface of the case.

(6) Although the foregoing embodiment shows an example in which the heat-transfer plates 60 are made of aluminum or aluminum alloy, the material is not so limited as long as the heat-transfer plates 60 are formed of a heat conductive material.

(7) Although the foregoing embodiment shows an example in which the power storage elements are batteries, they may be capacitors, etc.

(8) Although the foregoing embodiment shows an example used as a battery module 10 for ISG's, it can also be used as a battery module for other applications.

The invention claimed is:

1. An electricity storage module comprising:
a stack formed by stacking a plurality of power storage elements having positive and negative lead terminals that protrude outward from end portions thereof;
holder members made of an insulating resin and attached at least to the end portions of the power storage elements from which the lead terminals protrude, the holder members being arranged to hold the power storage elements; and
heat-transfer plate members disposed between power storage elements that are adjacent in a stacking direction of the stack, the heat-transfer plate members being made of a heat conductive material configured to conduct heat generated by the power storage elements to outside of the module,
wherein an engaging portion is provided on one of the holder members and the heat-transfer plate members, and an engaged portion arranged to be engaged by the engaging portion is provided on the other of the holder members and the heat-transfer plate members,
wherein the holder members and the heat-transfer plate members are integrated by mutual engagement of the engaging portions and the engaged portions, and
wherein the holder members are formed with slide portions on which the heat-transfer plate members are slidably mounted.

2. The electricity storage module according to claim 1, wherein
a plurality of engaging portions and a plurality of engaged portions are provided at opposing positions.

3. The electricity storage module according to claim 1, further comprising
a case that accommodates the stack, the holder members, and the heat-transfer plate members,
wherein the heat-transfer plate members are provided with heat conductive walls that are in contact with inner wall surfaces of the case to conduct the heat generated by the power storage elements to the outside of the module.

4. The electricity storage module according to claim 3, wherein,
among the plurality of power storage elements, a power storage element disposed at one end in the stacking direction is positioned in contact with one of the inner wall surfaces of the case.

5. The electricity storage module according to claim 3, wherein
the case has a lid portion protruding toward a power storage element disposed at one end in the stacking direction so as to contact the power storage element, to conduct the heat generated by the power storage element to the outside of the module.

6. The electricity storage module according to claim 1, wherein
the power storage elements have largest area surfaces facing in the stacking direction, the largest area surfaces contacting the heat-transfer plate members.

7. The electricity storage module according to claim 1, wherein
a first holder member of the holder members is provided with an engaging protrusion, and a second holder member of the holder members is provided with an engagement receiving portion arranged to receive the engaging protrusion.

8. The electricity storage module according to claim 1, wherein
the holder members each have a locking groove arranged to receive a locking convex formed on respective ones of the lead terminals.

9. The electricity storage module according to claim 1, wherein
the engaging portion includes a locking protrusion, and the engaged portion includes a locking hole arranged to receive the locking protrusion.

10. The electricity storage module according to claim 1, wherein
the holder members each have an insulating wall portion aligned with respective ones of the lead terminals relative to the stacking direction.

11. The electricity storage module according to claim 1, wherein
the heat-transfer plate members have convex portions and concave portions disposed adjacent outer peripheries of the heat-transfer plate members.

12. The electricity storage module according to claim 1, wherein
each of the holder members has first and second slide portions separated by a first distance along a direction orthogonal to the stacking direction, and the engaged portion extends for a second distance in the direction orthogonal to the stacking direction, the first distance being greater than the second distance.

13. An electricity storage module comprising:
a stack formed of a plurality of power storage elements having positive and negative lead terminals that protrude outward from end portions thereof;
a holder member made of an insulating resin and attached at least to an end portion of one of the power storage elements from which one of the lead terminals protrudes, the holder member being arranged to hold the one of the power storage elements; and
a heat-transfer plate member disposed between two of the power storage elements that are adjacent in a stacking direction of the stack, the heat-transfer plate member being made of a heat conductive material configured to conduct heat generated by the two of the power storage elements to outside of the module,
wherein an engaging portion is provided on one of the holder member and the heat-transfer plate member, and an engaged portion arranged to be engaged by the engaging portion is provided on the other of the holder member and the heat-transfer plate member,
wherein the holder member and the heat-transfer plate member are integrated by mutual engagement of the engaging portion and the engaged portion, and
wherein the holder member is formed with a slide portion on which the heat-transfer plate member is slidably mounted.

* * * * *